April 5, 1938. E. P. BEAUMONT 2,113,104
AUTOMATIC CHAIN LOCK
Original Filed Oct. 21, 1936 3 Sheets-Sheet 2
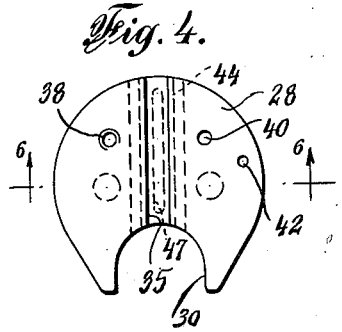
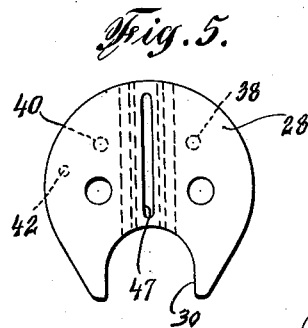
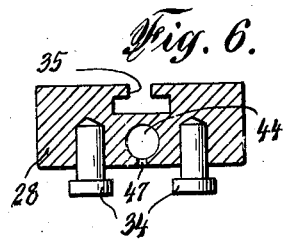
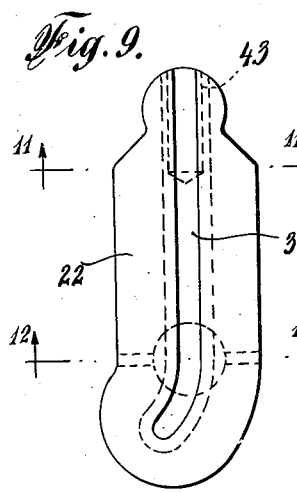
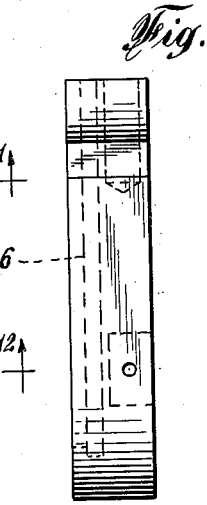
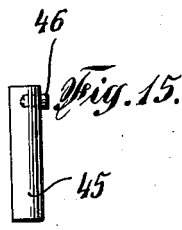
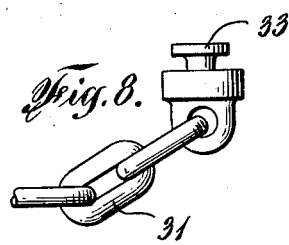
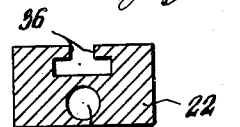
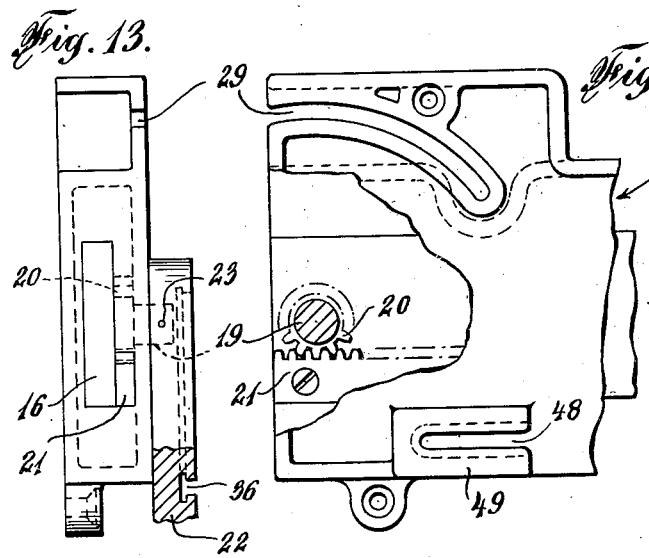
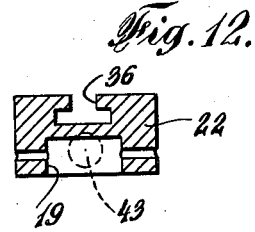
INVENTOR
Eugene P. Beaumont
BY
ATTORNEY April 5, 1938. E. P. BEAUMONT 2,113,104
AUTOMATIC CHAIN LOCK
Original Filed Oct. 21, 1936 3 Sheets-Sheet 3
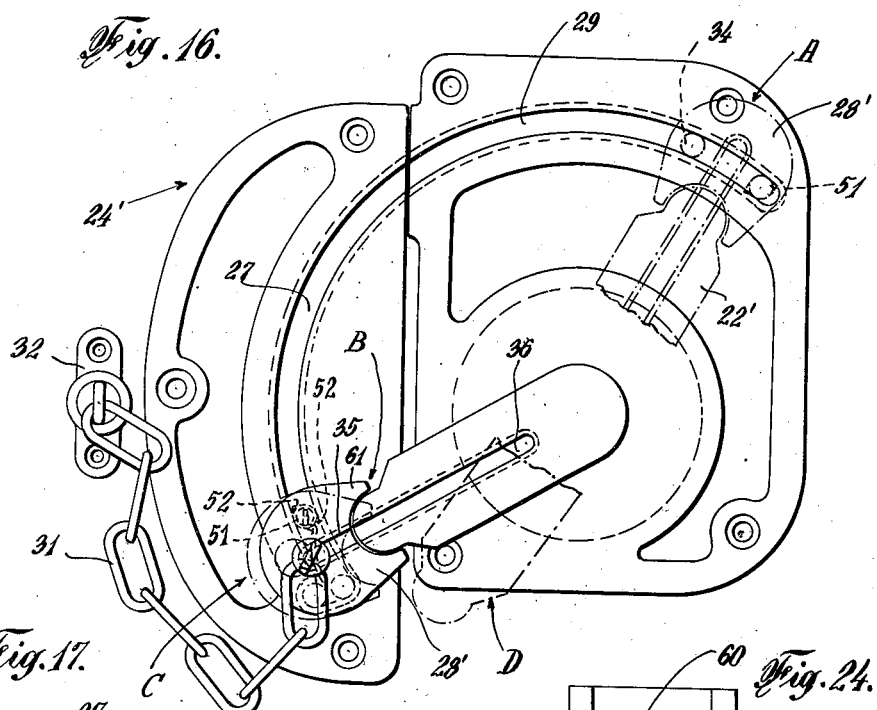
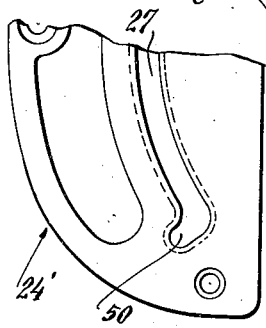
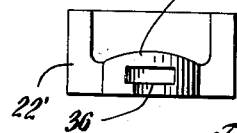
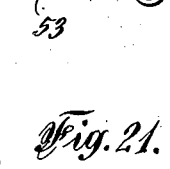
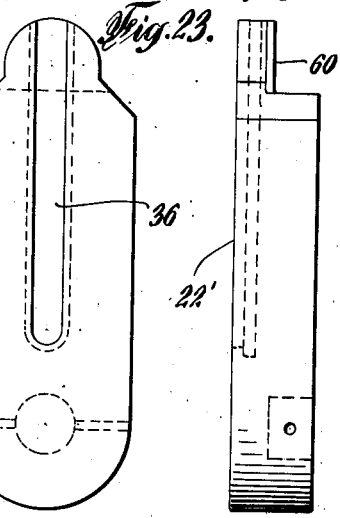
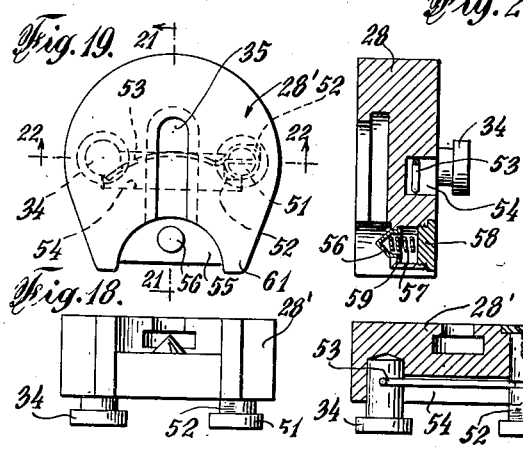
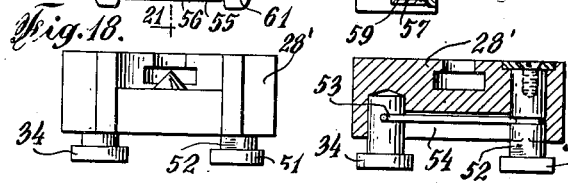
INVENTOR
Eugene P. Beaumont
BY
ATTORNEY Patented Apr. 5, 1938

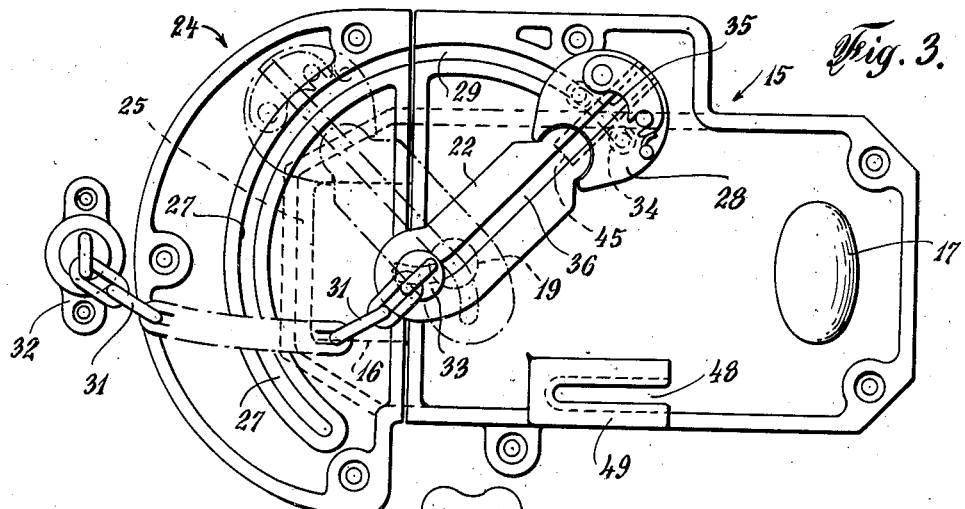
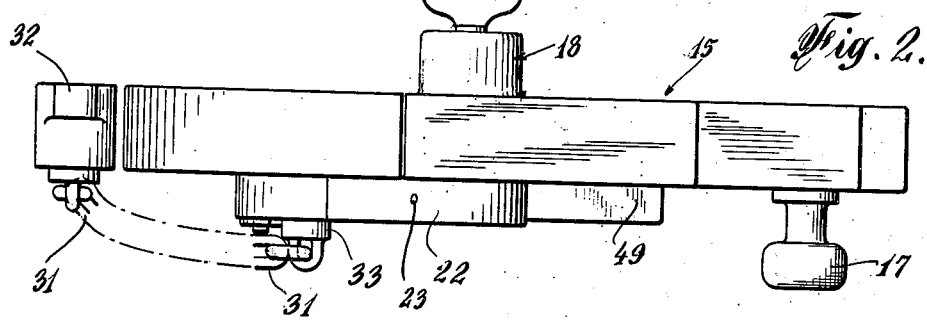
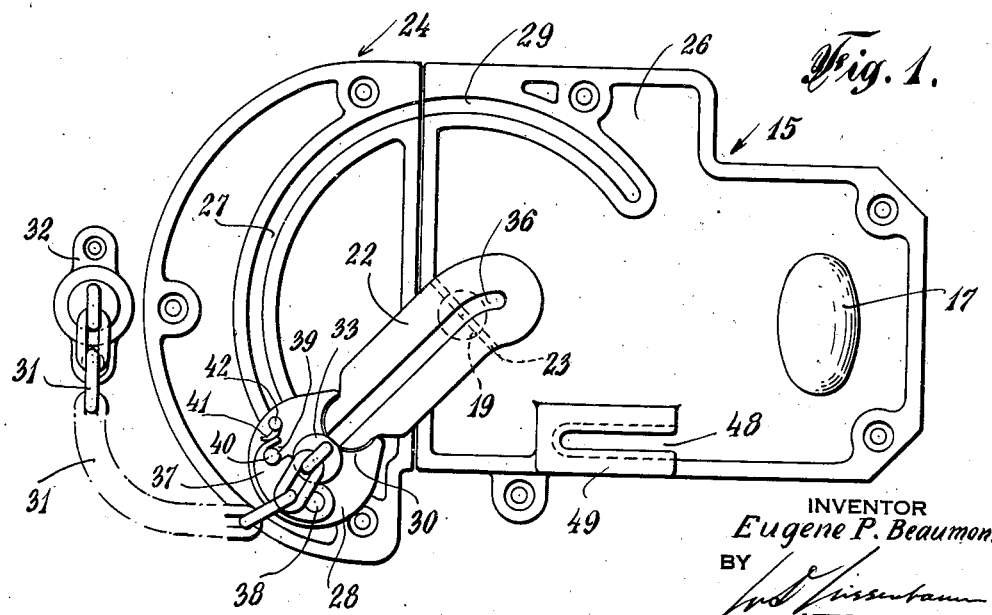

2,113,104

UNITED STATES PATENT OFFICE 2,113,104

AUTOMATIC CHAIN LOCK

Eugene P. Beaumont, New York, N. Y., assignor to Whiting Manufacturing Company, Minneapolis, Minn., a corporation of Minnesota Application October 21, 1936, Serial No. 106,736
Renewed September 17, 1937

11 Claims. (Cl. 70—93)

The present invention relates to locks, the components of which are permanently mounted on a door and its jamb, and more particularly to the type having a chain connection.

The principal object of this invention is to provide a novel and improved lock of the type mentioned, for automatically effecting a chain connection between a door and its jamb, and for automatically removing said connection, by key-controlled means operative from the outside surface of the door.

Another object of this invention is to provide a lock wherein upon movement of its bolt into the keeper mounted on the jamb, a chain connection is automatically effected between said door and jamb, and upon re-entrance of said bolt within its casing mounted on the door, said chain connection is automatically removed; the movement of the bolt being accomplished either by key-controlled operative from the outside surface of the door, or by manually controlled means operative from the inside surface of the door.

Other objects will become manifest as the disclosure proceeds.

To accomplish these objects, I provide in an embodiment of my invention, a lock having a bolt, slidable entirely into, and partially out from a casing mounted on a door, and a keeper for receiving said bolt mounted on the jamb. A chain, with one end fixed to the jamb, has its other end removably associated in a carrier member which is slidably mounted, and when the door is unlocked, is on on the jamb side of the structure. An arm, which may be designated as the chain-end receiving member, pivotally mounted on the casing and adapted for engagement with the chain carrier member when the door is shut, is associated with mechanism whereby it is swung upon movement of the bolt, either upward or downward taking the carrier member along with it, depending for its direction of motion upon whether the bolt is entering its keeper or the casing respectively. The carrier and receiving members are each provided with a channel for holding the free end of the chain. At the engagement of said members, these channels are in end-to-end communication. Upon movement of these members, they are made to assume such positions whereby the free end of the chain, by action of the force of gravity, is caused to fall from the channel in one of said members, into the channel of the other. A gravity actuated auxiliary bolt is also provided to effect an interconnection between said carrier and receiving members.

In the accompanying drawings, forming part of this application, similar characters of reference indicate corresponding parts in all the views.

Fig. 1 shows a lock embodying the teachings of my present invention, in unlocked condition.

Fig. 2 is a plan view thereof.

Fig. 3 shows the lock in fully locked condition.

Fig. 4 is a front view of the carrier member.

Fig. 5 is a rear view thereof.

Fig. 6 is a section taken at line 6—6 in Fig. 4.

Fig. 7 shows a hook member which is included in the embodiment herein.

Fig. 8 shows the engagement button at the free end of the chain.

Fig. 9 shows the receiving member.

Fig. 10 is a side view thereof.

Fig. 11 is a section taken at line 11—11 in Fig. 9.

Fig. 12 is a section at line 12—12 in Fig. 9.

Fig. 13 is an end view of the casing.

Fig. 14 is a front view of the casing, partly in section, showing the means included in this embodiment for swinging the receiving member upon movement of the bolt.

Fig. 15 shows an auxiliary bolt.

Fig. 16 shows a modified form of lock including the features of this invention, together with means whereby the chain-end receiving member lies entirely on the surface of the door when the latter is "unlocked", so that no part of said member shall project beyond the edge of the door onto the surface of the jamb. This view also shows various related positions of the conveying and receiving members.

Fig. 17 is a fragmentary view of the keeper included in this embodiment.

Fig. 18 is an elevation of the carrier member in said embodiment.

Fig. 19 is a plan view of the carrier member.

Fig. 20 shows a spring included in this modified embodiment.

Fig. 21 is a section at lines 21—21 in Fig. 19.

Fig. 22 is a section at lines 22—22 in Fig. 19.

Fig. 23 shows the receiving member included in the set up illustrated in Fig. 16.

Fig. 24 is a plan view thereof, and

Fig. 25 is a side view thereof.

In the drawings, the numeral 15 indicates a casing adapted to be mounted on the inside surface of a door, having a slidable bolt 16, which lies wholly within the casing 15, when the lock is in unlocked condition, and which can be partially slid out therefrom either by turning the knob 17, by hand at the inside surface of the door, or by key-controlled means as numeral 18, operative from the outside surface of the door, as is the usual construction of slidable bolt locks in everyday use. Extending horizontally from the casing 15, as a rotatably mounted pin 19, which terminates in a gear 20 at its end within the casing 15, which gear is in engagement with a rack 21, secured lengthwise along the bolt 16, in the direction of the latter's travel. An arm 22, at one end is secured by a pin 23, onto the externally extending end of the pin 19.

The numeral 24 indicates generally a keeper adapted to be mounted on the jamb to receive the bolt 16 into chamber 25, whereupon the door is locked by such interconnection. In front plate of keeper 24, and extending over in a plate portion 26 which is integral with the casing 15, is a slot 27, the centre line of which is part of a circle having the axis of pin 19 as its centre. The segment of this slot 27 in plate portion 26, is hereafter designated by the numeral 29, and it is to be noted that the surfaces of said plates are coplanar, respectively. Resting on the surface of these plates and free to slide thereon along said slot 27 as a track, is a carrier member designated generally for the purposes of this description, by the numeral 28, which is a block provided with a substantial notch 30 for the admission therein and recession therefrom of the free end of arm 22, and for engagement therewith, whereby upon swinging movement of the latter, the former will be carried along slot 27.

The headed pins 34, extending from the carrier member 28 through the slot 27, serve to maintain said member in its required path.

One end of a chain 31, linked to the bracket 32 mounted on the jamb, terminates at its free end in an engagement button 33.

The T-channel 35 across carrier member 28, and the T-channel 36 along the greater part of the length of member 22, at the engagement of those members, are in end-to-end communication. The channel 36 extends to a point beyond the axis of the pin 19, while passage in channel 35 is blocked by a hook 37, which is pivotally secured to the carrier member 28 at 38, and provided with a notch 39 to engage the pin 40 fixed in said member. A flat spring 41, secured to 28 at 42, maintains the hook 37 closed.

The arm member 22, is provided with a socket bore 43, which when members 22 and 28 are in engagement, is in end-to-end communication with the bore 44 in carrier member 28. These bores are in alignment, and likewise said T-channels are in alignment, and further to be noted, the line of said bores is parallel with the line of said channels. An auxiliary bolt 45, lies free to slide from within bore 44 to extend partially into bore 43 in the arm member 22; the scope of its travel being limited by pin 46 within slot 47 in member 28, which slot opens lengthwise in bore 44.

When the lock is in open condition, the carrier member 28 is at the lower end of the slot 27 in the keeper 24, with button 33 in channel 35, resting against hook 37, all on the jamb side, and with bolt 45 entirely within member 28. The arm 22 is in its lowest position and in engagement with the carrier member 28 at notch 30. The door may be opened and then shut, whereupon arm 22 will again set with its free end within the notch 30 and again engage the member 28.

When the bolt 16 is moved by either of the methods mentioned to enter chamber 25 in keeper 24, the gear 20 will be turned due to its engagement with the rack 21, swinging arm 22 upward, which latter will convey the carrier member 28 holding the button 33, upward along the slot 27.

As the line of the T-channels 35 and 36 approach the vertical, the force of gravity will cause the button 33 weighted by a portion of the chain 31, to fall, whereby it will slide into channel 36 of the arm 22, which may hereafter be called the receiving member, because it receives the said button from the carrier member 28. Simultaneously the bolt 45, by action of gravity, will fall to lie partially within the socket bore 43 in the receiving member 22, which conditions occur at the intermediate position of the various components as shown by the dotted representation in Fig. 1 of the drawings. The receiving member 22, is however swung further so that the carrier member 28, now not only engaged but also locked thereto, enters slot portion 29, and comes to rest beyond the vertical as shown in the Fig. 1, at which instant the bolt 15 has completed the extent of its withdrawal from within the casing 15. This describes the closed condition of the lock, namely a chain connection between the door and its jamb, and such interconnection maintained while the bolt 15 is within its keeper 24, and the manner of closing.

To unlock the door, the bolt 16 is moved by either of the methods aforementioned to come entirely within its casing 15, whereby gear 20 will be turned in a direction opposite to that it was formerly given, swinging arm 22 past vertical and downward conveying member 28 along slot 27, down to rest position as in Fig. 1. After the line of the T-channels 35 and 36 crosses the horizontal, the force of gravity will cause the button 33 to fall to rest again in carrier member 28, whereby the chain connection between door and jamb is removed, bolt 45 will again fall to lie entirely within the carrier member 28, and the lock will be in its unlocked condition as initially. This describes the operation of the opening of the lock.

To those versed in the art, the construction of a lock following the teachings of this invention to effect only a chain interconnection between a door and its jamb, is evident, and that the movement of the receiving arm 22 can be accomplished by a direct rotary motion imparted by the key-operative means, as in my co-pending application Serial No. 103,099.

Once the lock is mounted on the door and jamb properly, the free end of the chain need never be touched, for it assumes its respective positions always automatically. I do provide however, that should only a chain connection be desired by a person within a room, then the hook 37 is shifted, or the door is opened for the removal of the button 33 from the carrier member 28, for engagement thereof in a T-channel 48 in member 49, integral and extending forward of the casing 15.

Referring to the embodiment shown in Fig. 16, the bottom end of the slot 27, in the keeper 24', terminates in a pocket 50, off the locus of the circle of said slot. The pin 34 is secured in the carrier member 28' as in the embodiment first herein set forth, but the pin 51 is journalled free to turn therein, and is provided with the projections 52 whereby said pin 51 will not turn axially in its movement along the slot 27. Such arrangement permits the carrier member 28' to swivel about pin 51, after pin 34 has reached the bottom end of the slot 27. The spring 53, secured to pin 51, extends within slot 54 in the carrier member 28', and acts against the pin 34.

It is evident, that when the carrier member 28' and the receiving member 22' are in position indicated by the letter "A" in Fig. 16, that the chain connection is effected between the door and its jamb. Now, upon operation of the key-operative means 18, these members will be swung downward to the position indicated by the letter "B", whereupon the chain connection between the door and jamb will have been removed. Now, upon further movement of the member 22', it will leave the carrier member 28', for action of the spring 53 against the pin 34, will shift the latter to sit within the pocket 50, and said carrier member will assume the position as indicated by the letter "c", while the receiving member 22' will go to rest position entirely on the surface of the door, as indicated by the position lettered "D".

In front of the opening of the channel 35 in the carrier member 28', in a shelf 55, I provide a counterbored opening through which projects the conically headed, flanged, hollow pin 56, acted against by the compression spring 57, all maintained in assembled condition by the threadedly engaged plug 58, in such counterbore 59. It is to be noted that when the members are in the respective positions lettered "c" and "D", this pin 56 will block the opening of the channel 35, thus preventing the free end of the chain, indicated as 33, from accidently leaving the carrier member 28'. Upon movement of receiving member 22' from position "D" towards position "B", the rounded surface 60, at the extreme end of the member 22', will act as a cam to push the pin 56 downward into the bore in which it is mounted against action of the spring 57, and said end of the member 22' will hit against portion 61 of the carrier member 22', whereby the latter will be swivelled on pin 51 against action of the spring 53, thereby causing pin 34 to leave the pocket 50, and move into the line of the circle of the slot 27. In all other respects, the operation of the lock of Fig. 16, is identical as that described in the instance of the device of Fig. 1. The additional feature accomplished by the lock of Fig. 16, is that when the door is in "unlocked" condition, no part of the receiving member 22' lies beyond the edge of the door, so that no component of the device projects beyond such edge when the door is opened.

This invention is capable of numerous forms and various applications without departing from the essential features herein disclosed. It is therefore intended and desired that the embodiment shown herein be deemed illustrative and not restrictive and that the patent shall cover whatever features of patentable novelty exist in the invention disclosed; reference being had to the following claims rather than to the foregoing specific description herein to indicate the scope of the invention.

I claim:

1. In a lock for a door and its jamb, the combination of, a chain secured at one end to the jamb, a pair of members, each adapted to admit and engage the free end of the chain, mounted one on the door and the other on the jamb; the free end of the chain being slidably engaged in one of said members and capable of falling out of engagement therewith, and key-operative means adapted to be actuated from the outside surface of the door for shifting one of said members whereby the free end of the chain is caused by gravity to fall from the member it had first been in engagement with, and to enter and become engaged by the other of said members to effect or remove a chain connection between the door and jamb.

2. In a lock for a door and its jamb, the combination of, a chain-end receiving member pivotally mounted on the inside surface of the door, a chain-end carrier member slidably mounted on the jamb; both said members being in engagement whenever the door is shut, whereby upon any movement then of the first mentioned member, the other is conveyed along therewith, a chain secured at one end to the jamb; the free end thereof being slidably engaged in one of said members, and key-operative means adapted to be actuated from the outside surface of the door for swinging the chain-end receiving member, whereby the free end of the chain is caused by gravity to fall from the member it had first been in engagement with to enter and become engaged by the other of said members to effect or remove a chain connection between the door and jamb.

3. In a lock for a door and its jamb, the combination of, a chain-end receiving member pivotally mounted on the inside surface of the door, a curved track mounted on the jamb; the centre line of the track lying in the circumference of a circle with center at the point of pivot of the aforesaid member, a chain-end carrier member slidably mounted on said track, in engagement with said receiving member whenever the door is shut, whereby upon any movement then of the first mentioned member, the other is conveyed along therewith; both said members having channels in end-to-end communication upon engagement of said members, a chain secured at one end to the jamb; the free end of the chain terminating in an engagement button adapted for engagement in said channels, slidably engaged in the channel of one of said members, and key-operative means adapted to be actuated from the outside surface of the door for swinging the receiving member whereby the free end of the chain is caused by gravity to fall from the channel in the member it had first been engaged with, and to enter and become engaged in the channel of the other of said members to effect or remove a chain connection between the door and jamb.

4. In a lock for a door and its jamb, the combination of, a chain-end receiving member pivotally mounted on the inside surface of the door, a curved track mounted on the jamb, another curved track in continuation therewith, mounted on the door; the line of said tracks lying in the circumference of a circle with center at the point of pivot of said member, a chain-end carrier member slidably mounted along said tracks, positioned at the lower end of the track on the jamb, in engagement with said receiving member whenever the door is shut, whereby upon any movement then of the first mentioned member, the other is conveyed along therewith; both said members having channels in end-to-end communication upon engagement of said members, a chain secured at one end to the jamb; the free end thereof terminating in an engagement button adapted for engagement in said channels, slidably engaged in the channel of the carrier member, and key operative means adapted to be actuated from the outside surface of the door for swinging the receiving member upward whereby the free end of the chain is caused by gravity to fall from the channel in the carrier member into the channel of the receiving member for engagement therewith to effect a chain connection between the door and jamb; the receiving member coming to rest after the carrier member is conveyed onto the track mounted on the door.

5. In a lock as in claim 3, wherein the receiving and carrier members are provided with bores in end-to-end communication upon engagement of said members, and a bolt slidably carried and residing within the bore in the carrier member, adapted when the latter is conveyed upward along the track, to fall by action of gravity to lie within the bores in both said members whereby a connection is effected between them, and further adapted when the carrier member is conveyed downward along the track, to fall by action of gravity, out of the receiving member whereby said connection between said members is removed.

6. In a lock for a door and its jamb, the combination of a pair of members, one pivotally mounted on the inside surface of the door and the other slidably mounted on the jamb; both said members being in engagement whenever the door is shut, whereby upon movement then of the first mentioned member, the other is conveyed along therewith; both said members being provided with bores in end-to-end communication upon engagementment of said members, bolt slidably carried and residing within the bore of one of said members and key operative means adapted to be actuated from the outside surface of the door for swinging the pivoted member, whereby the bolt is caused to fall by action of gravity, to lie within the bores in both of said members whereby a connection is effected between the door and jamb and further adapted when the pivoted member is swung in the opposite direction to fall by the action of gravity entirely into the bore within the member in which it had first resided, whereby said connection between said members is removed.

7. In a lock for a door and its jamb, the combination of a chain-end receiving member pivotally mounted on the inside surface of the door, a chain-end carrier member slidably mounted on the jamb, a chain secured at one end to the jamb; the free end thereof being slidably engaged in the carrier member and key operative means adapted to be actuated from the outside surface of the door for swinging the chain-end receiving member upward whereby the latter engages and conveys the chain-end receiving member so that the free end of the chain is cause by gravity to fall from the carrier member and to enter and become engaged by the receiving member to effect a chain connection between the door and jamb and further adapted thereafter, for swinging the receiving member downward for the latter to convey the carrier member to its initial position so that the free end of the chain is caused by gravity to fall from the receiving member to enter and become engaged by the carrier member whereby said chain connection is removed, and for said members to become disengaged.

8. In a lock for a door and its jamb, the combination of a chain-end receiving member pivotally mounted on the inside surface of the door, a curved track mounted on a jamb; the center line of the track lying in the circumference of a circle with the center at the point of pivot of the aforesaid member; the lower end of said track terminating in a portion off said circumference and outside said circle, a chain-end carrier member slidably mounted on said track, a chain secured at one end of the jamb; the free end of the chain being slidably engaged in the chain-end carrier member and key operative means adapted to be actuated from the outside surface of the door for swinging the receiving member upward whereby the latter engages the chain-end receiving member and shifts it from the terminus of the track into the arcual track proper and thereafter conveys said chain-end carrier member along the track so that the free end of the chain is caused by gravity to fall from the carrier member and to enter and become engaged by the receiving member to effect a chain connection between the door and jamb and for the latter to convey the carrier member to its initial position so that the free end of the chain is caused by gravity to fall from the receiving member to enter and become engaged by the carrier member whereby said chain connection is removed, and for said members to become disengaged, and the carrier member to be returned to its initial position.

9. A device as in claim 8, wherein the chain-end carrier member has a pair of spaced pins extending therefrom to the track, one fixed and the other journalled to said member; said pins being slidably mounted in said track, with the journalled pin being incapable of axial rotation, and including a spring mounted on and extending from the journalled pin and pressing against the side of the fixed pin to urge the latter within the lower terminus of the track.

10. A device as in claim 8, wherein the chain-end carrier member has a pair of spaced pins extending therefrom to the track, one fixed and the other journalled to said member; said pins being slidably mounted in said track, with the journalled pin being incapable of axial rotation, and including a spring mounted on and extending from the journalled pin and pressing against the side of the fixed pin to urge the latter within the lower terminus of the track, and means mounted on the carrier member, adapted to block the exit of the free end of the chain from said member during the interval said member is out of engagement with the chain-end receiving member; said receiving member being adapted to shift such blocking means to clear said exit upon engaging the chain-end carrier member.

11. A device as in claim 2, including a means mounted on the chain-end carrier member, adapted to block the exit of the free end of the chain from said member during the interval said member is out of engagement with the chain-end receiving member; said receiving member being adapted to shift said blocking means to clear said exit upon engaging the chain-end carrier member.

EUGENE P. BEAUMONT.